Patented Mar. 18, 1930

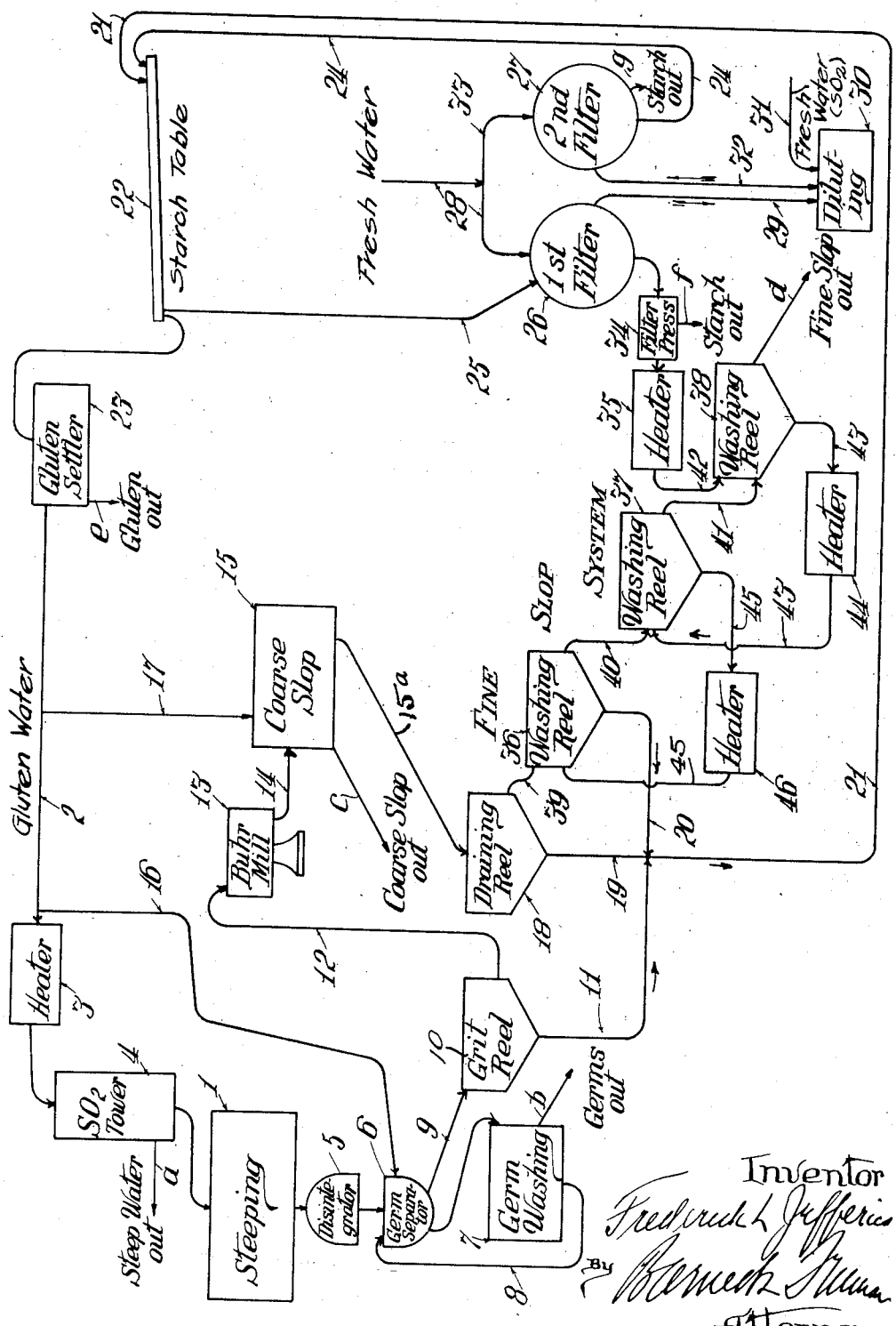

1,750,756

UNITED STATES PATENT OFFICE

FREDERICK L. JEFFERIES, OF LA GRANGE, ILLINOIS, ASSIGNOR TO INTERNATIONAL PATENTS DEVELOPMENT COMPANY, OF WILMINGTON, DELAWARE, A CORPORATION OF DELAWARE

MANUFACTURE OF STARCH

Application filed September 8, 1928. Serial No. 304,687.

This invention relates to the manufacture of starch from grain, especially Indian corn, and is concerned particularly with the part of the process known as the "fine slop separation" in which fine particles of bran and fibre are removed from the starch and gluten magma.

In accordance with methods heretofore employed the water for use in the fine slop system, which may be either fresh water, or, according to later practice, filtrate from the starch washing filters, has been heated to certain temperatures in order to facilitate the draining of the silk reels and shakers of the fine slop system and to assist in keeping the entire process heated to the customary temperatures, which may vary between 90° F. and 110° F. or over a greater range. The practice, in fact, was adopted many years ago of heating the fresh water used in the fine slop system to temperatures considerably higher than 110° F., that is higher than those of the water used in the germ and coarse slop systems for the purpose of facilitating drainage through the silk reels or shakers of the fine slop system. The usual practice in this respect has been to heat the water or filtrate at a single point in advance of the fine slop system, that is, in a single heater, and to a temperature high enough so that, taking into account the cooling effect of passing the liquids through the successive reels or shakers of the fine slop system, proper temperatures will be maintained at the other end of such fine slop system, from that at which the water enters as well as at the table heads. A practice of this sort, as applied to a system re-using waste waters, is disclosed in United States Patent No. 1,655,395. January 3, 1928 to G. M. Moffett.

The present invention is based on the discovery that better results are obtained if instead of heating the water, or starch filtrate, as the case may be, in a single heater before it enters the fine slop system and at such point to a relatively high temperature, the liquids entering and passing through the system are heated at several places to temperatures which are somewhat lower than the initial temperature of the water under the old process. The advantages of this improved method of procedure are: economy of heat, a consideration of some importance in a large factory and in a process handling very large quantities of water exposed in thin streams so that radiation losses are high; the avoidance of the danger of excessive heating at one place; more uniform temperature conditions throughout the fine slop system, with consequent better separation, the liquids, under the improved method, which pass successively through the several reels or shakers of the fine slop system being at more nearly the same temperature at all points instead of being hotter than necessary at one end of the system and perhaps too cool for efficient operation at the other, and particularly maintenance of the temperatures of the material flowing over the starch tables at the desired elevation without excessive heating at any place in the system in advance of the tables. In this respect it may be said that in the manufacture of starch by the wet method it has been customary to regulate temperatures in the system with respect to desired temperatures at the table heads, the table heads constituting one of the principal points of control for temperature since the maintenance of a proper temperature on the tables is essential in order to assure an effective separation between starch and gluten.

The invention is illustrated in a preferred form in the accompanying drawing which is a simplified flow sheet of the entire starch making process as improved by the present invention.

Referring to the drawing, the grain is steeped at 1 with gluten overflow water derived from the process, 2 designating the gluten overflow water return pipe in which is arranged a heater 3 and a sulphur tower 4. The steep water is drawn off at $a$ and sent to evaporators. The steeped grain is coarsely disintegrated in the disintegrator 5 and is then subjected to a separating operation at 6 for the removal of the germs. The germs are washed at 7, washed germs passing out of the wet starch system at $b$ and the washing liquid being returned to the germ system, by conduit 8. The other solids pass from the germ system by conduit 9 to a grit reel 10, from which the starch and gluten mixture passes through conduit 11 to the starch tables, as will be described, while the grits go through conduit 12 to a buhr mill 13, where the material is finely ground. The ground material passes through conduit 14 to the coarse slop system 15, which consists of a series of reels or shakers that remove from the magma the coarser particles of bran and fibre, the latter issuing from the wet starch system at c. Gluten overflow water is employed, according to recent practices, for making the separations in the germ separating and coarse slop systems, 16 indicating a pipe leading from the gluten overflow water pipe 2 to the germ system and, 17 a pipe leading from pipe 2 to the coarse slop system.

The liquid from the coarse slop system carrying starch, gluten and small particles of bran and fibre is first passed through conduit 15ª to a draining reel 18 from which the liquid passes to the starch tables through conduit 19. This conduit joins conduit 11 from the grit reel and a conduit 20 from the fine slop system—to be described—the liquids (starch and gluten) in conduits 11, 19 and 20 being delivered by a common conduit 21 to the starch tables 22. The starch settles out on the tables and the bulk of the water with the gluten tails off and is collected in a gluten settler tank 23, from which leads the gluten overflow water pipe 2 that supplies the steeping, germ and coarse slop systems with the water necessary for the operations carried on at these places.

After the starch has settled on the tables 22, it is flushed off by water derived from the starch washing operation, as will be described, which water is delivered to the starch tables through pipe 24. The flushed starch passes through a pipe 25 to the first of a pair of filters, designated 26 and 27. Here the starch is de-watered and then washed with fresh water which enters the filter at 28. The starch from filter 26 passes through conduit 29 to a diluting tank 30 where it is wet up with fresh water, preferably treated with sulphur dioxide, which enters through pipe 31. The diluted starch passes through conduit 32 to the second filter 27 where it is again dewatered and thereafter washed with fresh water entering the filter through pipe 33. The filtrate from the second filter, the soluble content of which is low, is used for flushing the starch from the tables, as above described. The filtrate from the first starch filter 26 is first passed through a filter press 34, to remove suspended solids, and is then heated in the heater 35.

The system as described so far is the same as that disclosed in the Moffett Patent 1,655,395, above referred to, (to which reference can be made for details not specifically illustrated and described herein), except that the starch filtrate from the first filter is not heated to as high a temperature as contemplated in the system of said patent and in the system using fresh water for the fine slop which the patented system supplanted. According to the present invention, the starch filtrate may be heated in heater 35 to a temperature between 100° and 110° F. It enters the fine slop system at substantially this temperature, which may be increased if deemed advisable.

The fine slop system is shown as consisting of three washing reels 36, 37, 38, in addition to the draining reel 18, which may perhaps be regarded as part of the line slop system. The tailings from the draining reel 18 pass through conduit 39 to the washing reel 36. The tailings from this reel pass through conduit 40 to washing reel 37 and the tailings from washing reel 37 pass by conduit 41 to the washing reel 38. The fine slop leaves the process from reel 38, as indicated at d. The starch filtrate heated in the heater 35 passes by pipe 42 to the last washing reel 38 of the fine slop system. The liquid passing through reel 38 goes through a pipe 43 to washing reel 37. A heater 44 is located in pipe 43. The liquid passing through reel 37 goes to reel 36 through a pipe 45, in which is located a heater 46. The heaters 44 and 46 are booster heaters and serve to keep the liquids in the fine slop system substantially up to their temperature of entrance so that the desired table temperatures may be maintained without any excessive heating of the material at any point in the wet starch system. These heating devices may be of any desired type, direct or indirect, or, the liquids may be heated at these places by the injection of steam. This latter is practicable, if not altogether desirable, since, while the injection of steam introduces a certain amount of water into the system, tending to destroy the water balance whereby the system operates as a completely closed system, the amount of steam introduced is so small that the increase of water to the system is not a factor of very great importance.

Gluten is withdrawn from the system at the gluten outlet e of settler 23. The starch which issues at g from the second filter 27 is finished starch, except as it may require drying if it is to be marketed as starch. The filter pressing of the filtrate from the first washing filter 26 which takes place in the filter press 34 also yields a certain amount of starch, the outlet for which is indicated at f.

I claim:

1. In the manufacture of starch from corn by a method comprising subjecting the starch liquor derived from germ and coarse slop separations to a fine slop separation in a system of sieving devices through which the fine slop mixed with water is passed successively: the improvement which consists in heating the fine slop liquids at intervals during their passage through the fine slop system.

2. In the manufacture of starch from corn by a method comprising subjecting the starch liquor derived from germ and coarse slop separating operations to a fine slop separation in a system of sieving devices through which the fine slop mixed with water is passed successively: the improvement which consists in heating the water before it enters the first sieving device of fine slop system and heating the slop and water mixture passing through said system in advance of each other sieving device thereof.

3. In the manufacture of starch from corn by a method comprising subjecting the starch liquor derived from germ and coarse slop separating operations to a fine slop separation in a system of sieving devices through which the fine slop mixed with water is passed successively, washing the starch, and utilizing the wash water for the fine slop separation: the improvement which consists in heating the water derived from the starch washing operation before it enters the first sieving device of the fine slop system and heating the slop and water mixture passing through the fine slop system to approximately the same temperature in advance of each of the sieving devices of said system.

FREDERICK L. JEFFERIES.